United States Patent
Kawamura et al.

(10) Patent No.: US 11,508,491 B2
(45) Date of Patent: Nov. 22, 2022

(54) RADIATION SOURCE FOR NONDESTRUCTIVE INSPECTION, AND METHOD AND APPARATUS FOR MANUFACTURING SAME

(71) Applicant: CHIYODA TECHNOL CORPORATION, Tokyo (JP)

(72) Inventors: Hiroshi Kawamura, Tokyo (JP); Hidetaka Kanazawa, Tokyo (JP); Takashi Saito, Tokyo (JP); Takashi Ishii, Tokyo (JP)

(73) Assignee: CHIYODA TECHNOL CORPORATION, Tokyo (JP)

( * ) Notice: Subject to any disclaimer, the term of this patent is extended or adjusted under 35 U.S.C. 154(b) by 28 days.

(21) Appl. No.: 17/122,230

(22) Filed: Dec. 15, 2020

(65) Prior Publication Data
US 2022/0189650 A1    Jun. 16, 2022

(51) Int. Cl.
*G21G 4/06*    (2006.01)
*G01N 23/02*   (2006.01)

(52) U.S. Cl.
CPC ............. *G21G 4/06* (2013.01); *G01N 23/02* (2013.01); *G01N 2223/204* (2013.01)

(58) Field of Classification Search
CPC ........ G01N 23/00; G01N 23/02; G01N 23/04; G01N 23/046; G01N 23/083; G01N 23/043; G01N 23/18; G01N 2223/204; G21G 4/06; G21G 1/02; Y02E 30/30
See application file for complete search history.

(56) References Cited

U.S. PATENT DOCUMENTS

| | | |
|---|---|---|
| 3,324,540 A | 6/1967 | Lotts et al. |
| 8,542,789 B2 | 9/2013 | Russell, II et al. |
| 2011/0216868 A1 | 9/2011 | Russell, II et al. |
| 2013/0170927 A1 | 7/2013 | Dayal et al. |
| 2018/0028839 A1 | 2/2018 | Yoshimizu et al. |
| 2019/0295736 A1* | 9/2019 | Vose .................. G21G 4/06 |

FOREIGN PATENT DOCUMENTS

| | | |
|---|---|---|
| EP | 3 465 697 B1 | 3/2020 |
| GB | 2 119 157 A | 11/1983 |
| JP | H01-066600 A | 3/1989 |

(Continued)

OTHER PUBLICATIONS

Apr. 26, 2021 Extended European Search Report issued in European Patent Application No. 20214472.1.

(Continued)

*Primary Examiner* — Jurie Yun
(74) *Attorney, Agent, or Firm* — Oliff PLC

(57) ABSTRACT

An irradiation target is formed into a sphere. The spherical irradiation target can be iridium metal containing natural or enriched iridium. The radiation source can be manufactured by manufacturing a spherical irradiation target, accommodating the spherical irradiation target in a rotating capsule, and rotating an axial flow impeller by a downward flow of a reactor primary coolant, whereby the rotating capsule is rotated. This radiation source provides an improved nondestructive inspection image having a high geometric resolution, and has no radiation source anisotropy and also has high target recyclability.

3 Claims, 6 Drawing Sheets

(56) References Cited

FOREIGN PATENT DOCUMENTS

| JP | 2004-179189 A | 6/2004 |
| JP | 2010-127825 A | 6/2010 |
| JP | 2011-185927 A | 9/2011 |
| JP | 2013-140136 A | 7/2013 |
| RU | 2 663 222 C2 | 8/2018 |
| WO | 2004/109716 A2 | 12/2004 |
| WO | 2017/205202 A1 | 11/2017 |

OTHER PUBLICATIONS

May 24, 2022 Office Action issued in Japanese Patent Application No. 2021-076616.
Mar. 29, 2022 Office Action issued in Russian Patent Application No. 2020141411/28(077030).
Aug. 23, 2022 Decision of Dismissal of Amendment issued in Japanese Patent Application No. 2021-076616.
Aug. 23, 2022 Decision on Refusal issued in Japanese Patent Application No. 2021-076616.
Katoh, Hisashi et al., "Production of Radioisotopic Gamma Radiation Sources in JAERI", Japan Atomic Energy Research Institute, JAERI-M 8810, pp. 1-37, 1980.

\* cited by examiner

CROSS-SECTIONAL VIEW

IN CASE OF NEUTRON IRRADIATION IN REFLECTOR REGION

OUTER MICRO SPHERES

INNER MICRO SPHERES

RADIATION SOURCE FOR NONDESTRUCTIVE INSPECTION, AND METHOD AND APPARATUS FOR MANUFACTURING SAME

TECHNICAL FIELD

The present invention relates to a radiation source for a nondestructive inspection, and a method and apparatus for manufacturing the same. In particular, the present invention relates to a radiation source for a nondestructive inspection with which an image having a high geometric resolution is obtained by a nondestructive inspection and that can make target-by-target source strength uniform and is easily recyclable, and a method and apparatus for manufacturing the same.

BACKGROUND ART

Japanese Patent Application Laid-Open No. 2010-127825 describes a technique for manufacturing radiation sources for a nondestructive inspection (hereinafter, may be referred to simply as radiation sources) by using a nuclear reactor.

SUMMARY OF INVENTION

Technical Problems to be Solved

However, since three to four disc-like targets having, for example, a diameter of 1.5 mm×a thickness of 0.2 mm have conventionally been stacked to form a cylindrical radiation source, radiations emitted from the top and bottom surfaces and the side surface of the radiation source have been anisotropic. In addition, there have also been problems such as nonuniform target-by-target source strength, low geometric resolution of a nondestructive inspection image (for example, picture), difficulty in setting an intended source strength during re-irradiation due to target-by-target variations in source strength, and lack of target recyclability.

The present invention has been achieved to solve the foregoing conventional problems, and an object thereof is to provide a radiation source for a nondestructive inspection that provides a nondestructive inspection image having a high geometric resolution and has no radiation source anisotropy, uniform target-by-target source strength, and high target recyclability, and a method and apparatus for manufacturing the same.

Means for Solving the Problems

The present invention solves the foregoing problems by forming an irradiation target of a radiation source for a nondestructive inspection into a small sphere with a diameter of about 0.5 to 1.5 mm.

The spherical irradiation target can be iridium metal containing natural or enriched iridium 191.

The present invention also solves the foregoing problems by a method for manufacturing a radiation source for a nondestructive inspection, including manufacturing a spherical irradiation target, accommodating the spherical irradiation target in a rotating capsule, and rotating an axial flow impeller by a downward flow of a reactor primary coolant, whereby the rotating capsule is rotated.

Here, the spherical irradiation target can be manufactured by dropping molten iridium into a liquid.

Alternatively, the spherical irradiation target can be manufactured by machining.

A plurality of the spherical irradiation targets can be loaded into the rotating capsule in a plurality of layers.

The present invention also solves the foregoing problems by an apparatus for manufacturing a radiation source for a nondestructive inspection, including a rotating capsule that accommodates a spherical irradiation target, and an axial flow impeller that is rotated by a downward flow of a reactor primary coolant, the rotating capsule being rotated by the axial flow impeller.

Advantageous Effects of Invention

According to the present invention, the irradiation target of small spherical shape can improve the geometric resolution of a nondestructive inspection image compared to a disc-like one. In addition, the anisotropy of the radiation source can be eliminated. Moreover, smaller variations in source strength improves the recyclability of the target, so that the scarce resources can be efficiently used to reduce material cost. Uniform radiation sources for a nondestructive inspection can be efficiently manufactured for improved cost performance. The radiation sources can be easily manufactured with low cost since the capsule is rotated by utilizing the downward flow of the reactor primary coolant without rotating the capsule by driving a motor with an external power supply. These and other novel features and advantages of the present invention will become apparent from the following detailed description of preferred embodiments.

DESCRIPTION OF EMBODIMENTS

An embodiment of the present invention will be described in detail below with reference to the drawings. It should be noted that the present invention is not limited by the description of the following embodiment or practical examples. Components of the following embodiment and practical examples include ones readily conceivable by those skilled in the art, substantially identical ones, and ones so-called within the range of equivalency. The components disclosed in the following embodiment and practical examples may be combined as appropriate, and may be selectively used as appropriate.

Figure 1:
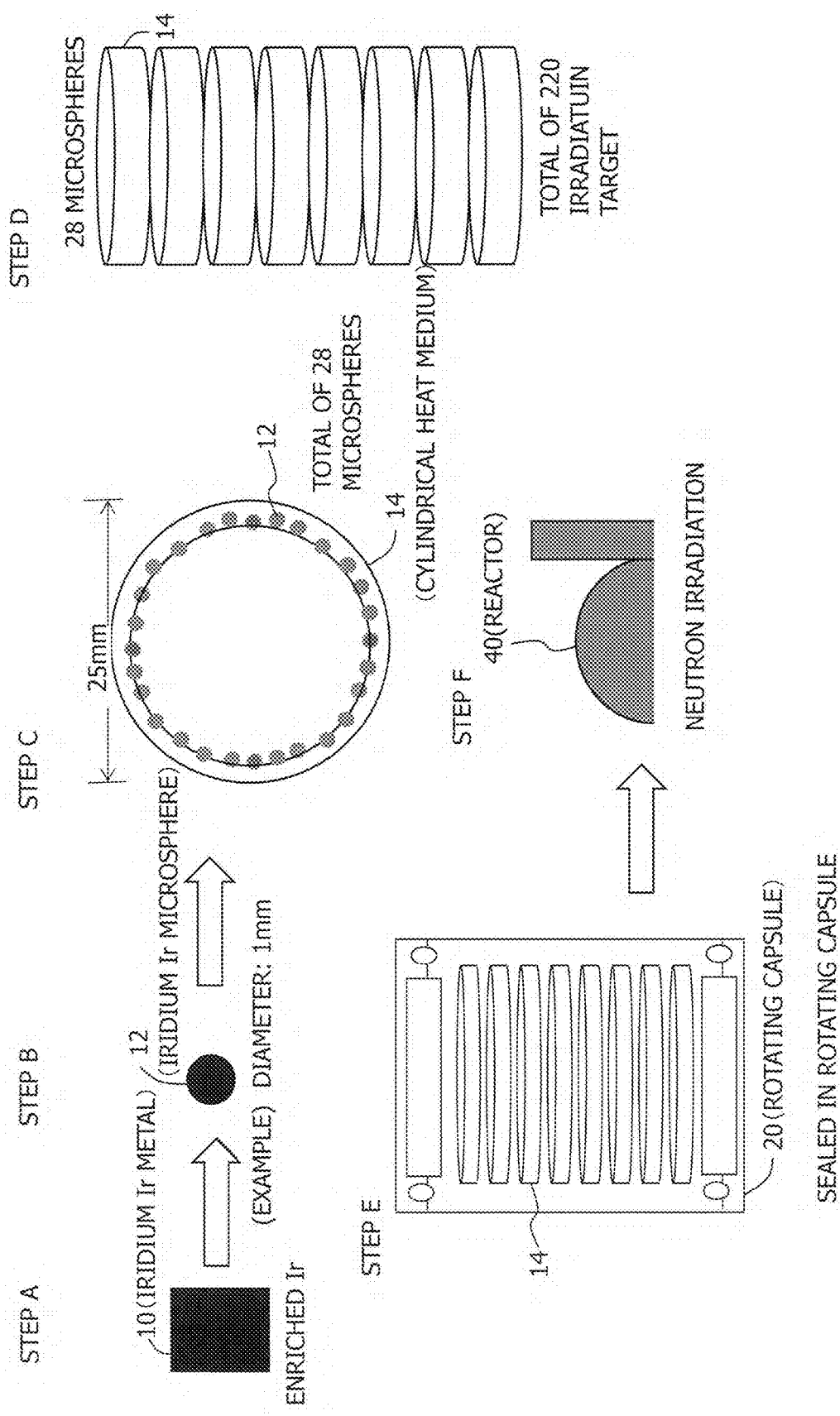
FIG. 1 is a diagram schematically showing a first half of an iridium 192 ($^{192}$Ir) manufacturing procedure according to an embodiment of the present invention.

FIG. 1 schematically shows a first half of an $^{192}$Ir manufacturing procedure according to the embodiment of the present invention.

As shown in steps A and B of FIG. 1, iridium (Ir) microspheres 12 with a diameter of 1 mm, a diameter tolerance of ±0.02 mm, and a weight of 12 mg or so, for example, are manufactured from iridium (Ir) metal 10 made of enriched iridium (Ir) that is 80%-enriched $^{191}$Ir, for example.

The manufacturing uses an iridium metal melting technique. The Ir microspheres 12 can be manufactured by dropping molten iridium into a liquid (such as water).

Alternatively, the Ir microspheres 12 can be manufactured by machining, using a fine turning machining technique.

Next, as shown in step C of FIG. 1, 28 Ir microspheres 12 are loaded per layer as appropriately spaced at distances of, e.g., 2 mm along a 20-mm-diameter inner circumference of a cylindrical aluminum heat medium 14 having a diameter of, e.g., 25 mm. As shown in step D of FIG. 1, for example, eight such layers are loaded in a stacked manner vertically at appropriate distances to provide a total of approximately 220 irradiation targets, for example.

Next, as shown in step E of FIG. 1, the eight layers of heat media 14 loaded with the Ir microspheres 12 that are irradiation targets are sealed in a rotating capsule (also referred to as an irradiation ampule) 20. As shown in step F of FIG. 1 (=step A of FIG. 2), the rotating capsule 20 is inserted into a reactor 40, and irradiated with neutrons while being rotated by a downward flow of the reactor primary coolant. The reason why the rotating capsule 20 is not fixed but rotated is to make the neutron irradiation uniform. The present embodiment utilizes the downward flow of the reactor primary coolant, and therefore does not need an electric motor for rotation, an external power supply, a connection cable thereof, or the like, and can be configured with low cost. Moreover, the installation operations are simple and easy since the cableless rotating capsule 20 is simply put in the passage of the reactor primary coolant.

Figure 2:
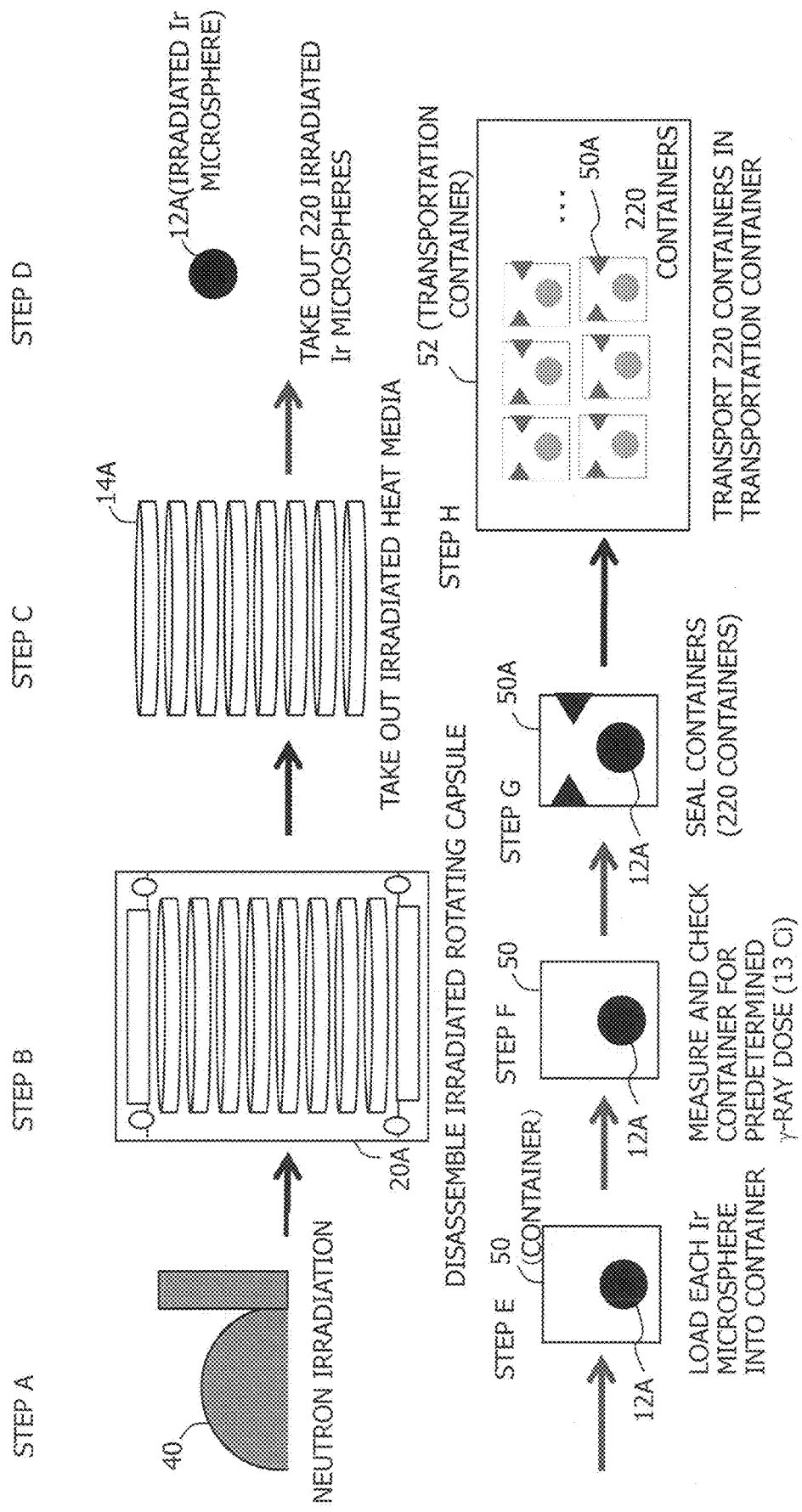
FIG. 2 is a diagram schematically showing a second half of the same.

Next, as shown in step B of FIG. 2, the irradiated rotating capsule 20A taken out of the reactor 40 is disassembled. As shown in step C of FIG. 2, the irradiated heat media 14A including the irradiated Ir microspheres 12A are taken out. Then, as shown in step D of FIG. 2, the approximately 220 irradiated Ir microspheres 12A are taken out. Next, as shown in step E of FIG. 2, each of the irradiated Ir microspheres 12A is loaded into a container 50. As shown in step F of FIG. 2, the container 50 is measured and checked for a predetermined γ-ray dose (for example, 13 Ci). As shown in step G of FIG. 2, the container 50 is sealed. As shown in step H of FIG. 2, the sealed containers 50A are transported in a transportation container 52.

Figure 3:
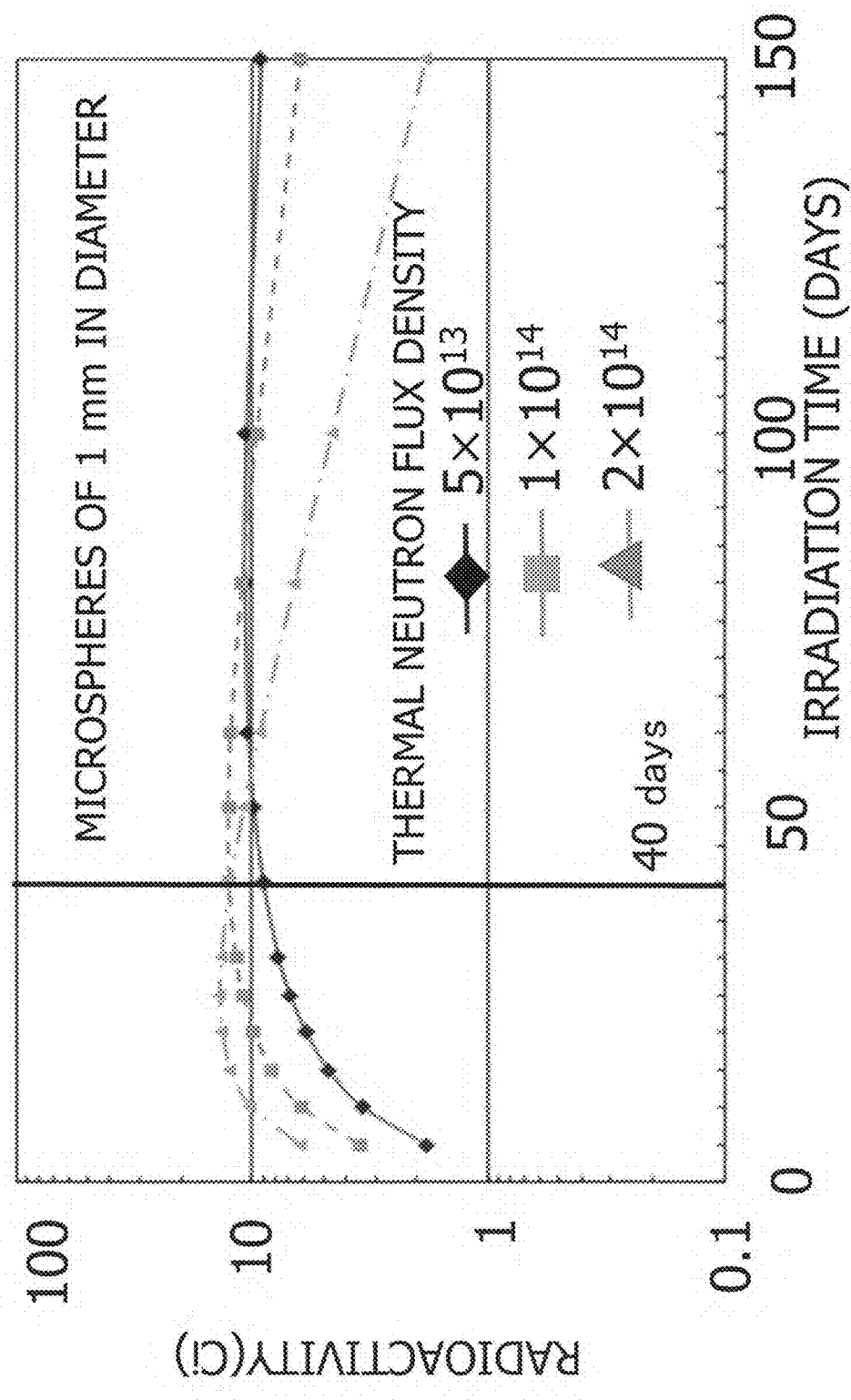
FIG. 3 is a chart showing a nuclear evaluation of iridium targets obtained by enriching iridium 191 ($^{191}$Ir) for describing the principle of the present invention.

FIG. 3 shows a nuclear evaluation of Ir targets containing enriched $^{191}$Ir in examining the present invention.

To manufacture $^{192}$Ir, a thermal neutron flux density of approximately 1 to $2\times10^{14}$ (n/cm$^2$) is needed regardless of whether to enrich $^{191}$Ir. For example, in the case of transportation in every two months, the irradiation time can be 40 days.

Figure 4A:
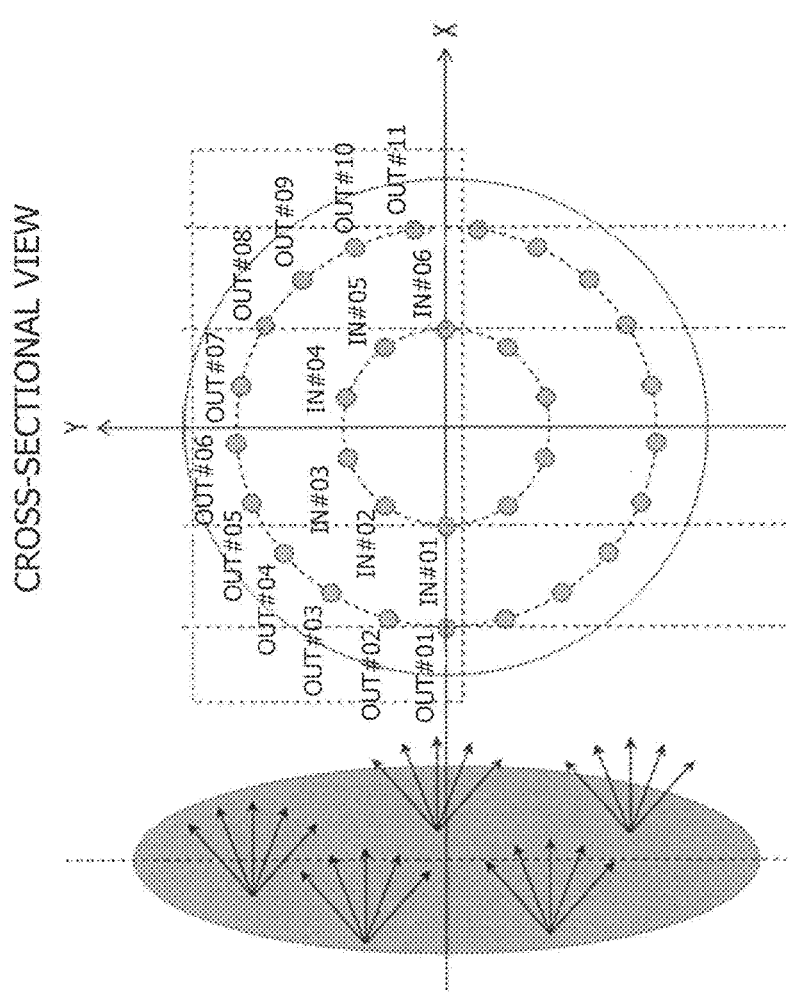
FIG. 4A is a diagram showing the effect (self shielding effect) of an $^{191}$Ir reaction cross section for the same purpose.

Next, FIG. 4 shows a result of an examination of the effect (self-shielding effect) of an $^{191}$Ir reaction cross section similarly in examining the present invention.

Figure 4B:
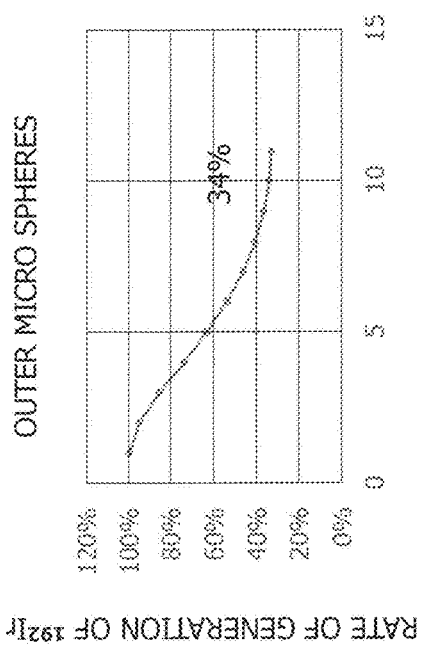
FIG. 4B is a chart showing the rate of generation of $^{192}$Ir in outer spheres for the same purpose.
Figure 4C:
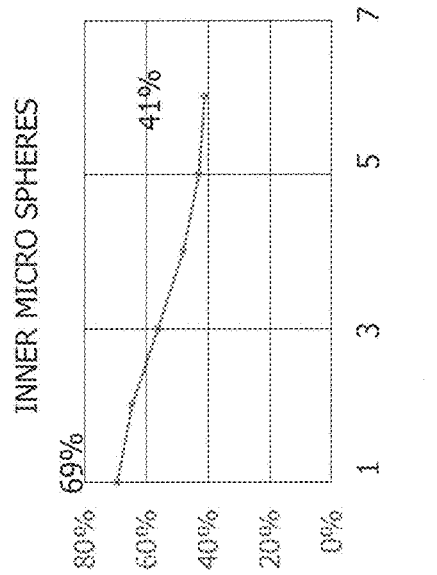
FIG. 4C is a chart showing the rate of generation of $^{192}$Ir in inner spheres for the same purpose.

The reaction cross section of Ir with neutrons is greater than that of uranium, and Ir microspheres in front block neutrons (self-shielding). Suppose that, as shown to the left in FIG. 4A, neutrons come in one direction (in the diagram, from the left), and Ir microspheres are arranged on an inner circle and an outer circle as shown in a cross-sectional view shown to the right in FIG. 4A. In such a case, the amount of generation of $^{192}$Ir is nonuniform as shown in FIG. 4B (the rate of generation of $^{192}$Ir in the outer spheres) and FIG. 4C (the rate of generation of $^{192}$Ir in the inner spheres). Rotation makes the amount of generation uniform since Ir microspheres are irradiated with neutrons in all directions. Note that Ir microspheres are desirably loaded only on the outer circle since the amount of generation differs between the inner circle and the outer circle.

Figure 5:
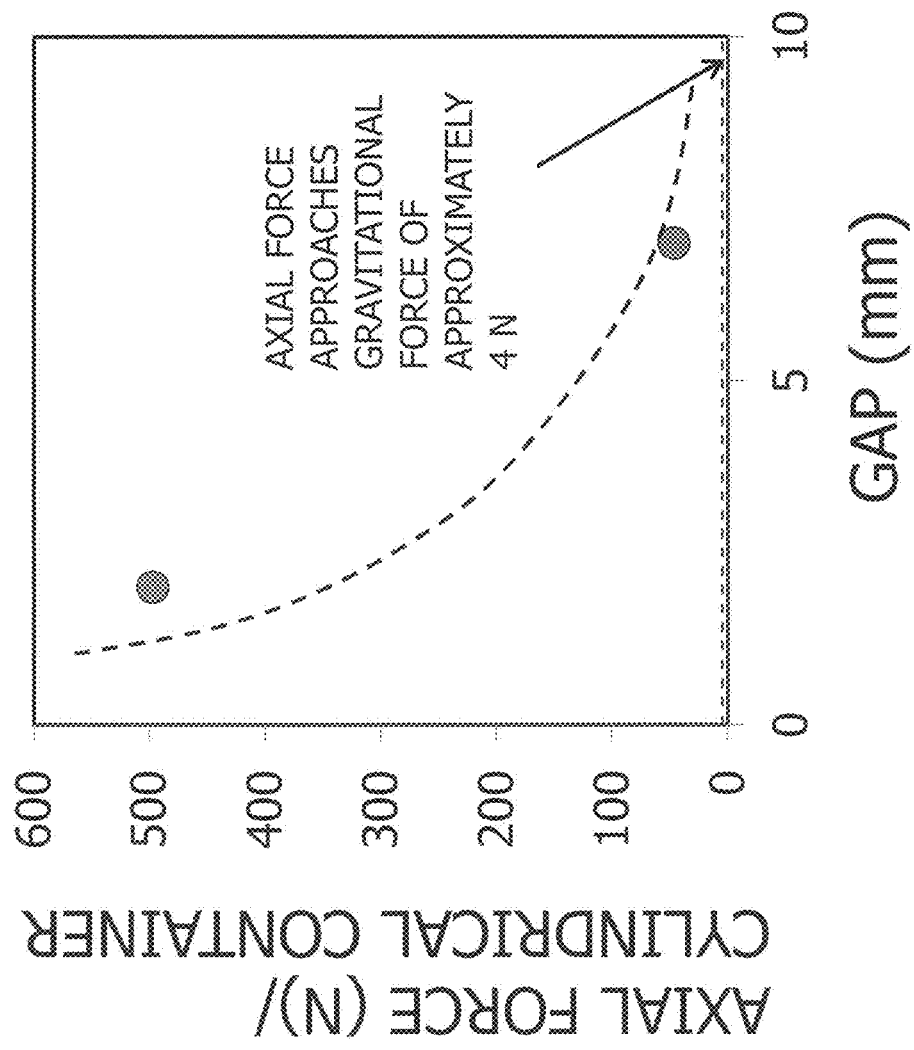
FIG. 5 is a chart showing a result of an evaluation of the rotatability of a rotating capsule by a reactor primary coolant for the same purpose.

Moreover, FIG. 5 shows a result of an evaluation of the rotatability of the rotating capsule by the reactor primary coolant similarly in examining the present invention.

Since the flow rate in a gap portion is 1000 times the rotation speed or more, the flow at the surface of the cylindrical container passes through the gap portion without rotation. A mechanism for converting the axial flow into a rotational flow is therefore needed. In this system, an excessive axial force as shown in FIG. 5 is found to occur due to loss of the flow colliding with the cylindrical container and loss occurring in the gap portion. To rotate the cylindrical container, it is then found that a thrust bearing for supporting the axial force (axial load of approximately 50 N or more for a gap of 7 mm) needs to be applied.

Figure 6:
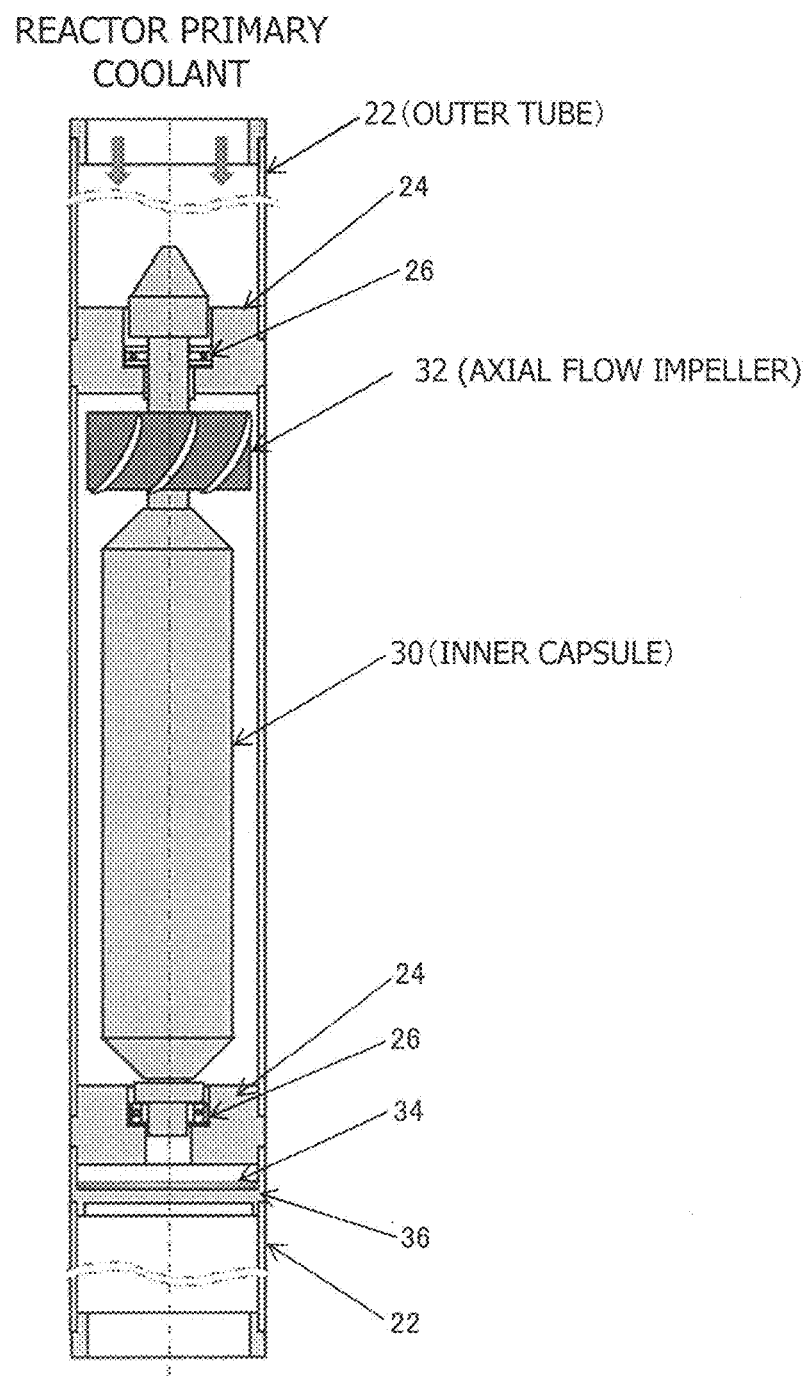
FIG. 6 is a schematic diagram showing a cross section of an $^{192}$Ir manufacturing rotating capsule usable in the foregoing embodiment.

FIG. 6 shows a state where an $^{192}$Ir manufacturing rotating capsule is inserted into a primary coolant channel running vertically inside the reactor 40.

An inner capsule 30 made of A5052, for example, and accommodating the rotating capsule 20 is accommodated in an outer tube 22 made of A6063, for example. The inner capsule 30 is then inserted into a reactor primary coolant channel. The shaft of the inner capsule 30 is rotatably supported in the outer tube 22 at the top and bottom by bearings 26 made of SUS304, for example, and bearing holders 24 made of A5052, for example. The shaft is further equipped with an axial flow impeller 32 similarly made of A5052. In the diagram, the reference numeral 34 denotes a mesh made of SUS304, for example, and the reference numeral 36 denotes a mesh holder made of A5052, for example. The axial flow impeller 32 is thus rotated by the downward flow of the reactor primary coolant, whereby the inner capsule 30 and the rotating capsule 20 therein are also rotated.

The foregoing radiation source has a dose of, e.g., 13 Ci in view of the fact that the intended amount of radioactivity upon shipping from the reactor is 10 Ci. However, a radiation source of 39 Ci, i.e., 1.3 times of 30 Ci can be manufactured in view of future demand.

In the foregoing embodiment, the radioactive isotope is described to be iridium Ir 192. However, the type of radioactive isotope is not limited thereto, and other radioactive isotopes such as cobalt Co 60, cesium Cs 127, ytterbium Yb 169, selenium Se 75, and thulium Tm 170 may be used. The size and the number of layers of the heat medium 14, the number of microspheres, and the like are not limited to the foregoing embodiment, either.

REFERENCE SIGNS LIST

10 . . . iridium (Ir) metal
12, 12A . . . iridium (Ir) microsphere
14, 14A . . . heat medium
20 . . . rotating capsule
30 . . . inner capsule
32 . . . axial flow impeller
40 . . . nuclear reactor
50, 50A . . . container
52 . . . transportation container

The invention claimed is:

1. A method for manufacturing a radiation source for a nondestructive inspection, the method comprising:
   manufacturing a spherical irradiation target by dropping molten iridium into a liquid;
   accommodating the spherical irradiation target in a rotating capsule; and
   rotating an axial flow impeller by a downward flow of a reactor primary coolant, whereby the rotating capsule is rotated.

2. The method for manufacturing a radiation source for a nondestructive inspection according to claim 1, wherein a plurality of the spherical irradiation targets are loaded into the rotating capsule in a plurality of layers.

3. An apparatus for manufacturing a radiation source for a nondestructive inspection, comprising:
   a rotating capsule that accommodates a spherical irradiation target; and
   an axial flow impeller that is rotated by a downward flow of a reactor primary coolant,
   whereby the rotating capsule being rotated by the axial flow impeller.

* * * * *